(12) United States Patent
Scott et al.

(10) Patent No.: US 10,960,548 B2
(45) Date of Patent: Mar. 30, 2021

(54) MAP-BASED FRAMEWORK FOR THE INTEGRATION OF ROBOTS AND SMART DEVICES

(71) Applicant: SERVICE ROBOTICS & TECHNOLOGIES, INC., Springfield, VA (US)

(72) Inventors: Gregory P. Scott, Washington, DC (US); Karoline P. Pershell, Washington, DC (US)

(73) Assignee: SERVICE ROBOTICS & TECHNOLOGIES, INC., Springfield, VA (US)

( * ) Notice: Subject to any disclaimer, the term of this patent is extended or adjusted under 35 U.S.C. 154(b) by 0 days.

(21) Appl. No.: 16/763,710

(22) PCT Filed: Nov. 21, 2018

(86) PCT No.: PCT/US2018/062196
§ 371 (c)(1),
(2) Date: May 13, 2020

(87) PCT Pub. No.: WO2019/104133
PCT Pub. Date: May 31, 2019

(65) Prior Publication Data
US 2020/0368913 A1    Nov. 26, 2020

Related U.S. Application Data

(60) Provisional application No. 62/589,089, filed on Nov. 21, 2017.

(51) Int. Cl.
*B25J 9/16*         (2006.01)
*B25J 19/02*        (2006.01)
(Continued)

(52) U.S. Cl.
CPC .......... *B25J 9/1692* (2013.01); *B25J 19/023* (2013.01); *G05D 1/0044* (2013.01); *G05D 1/0274* (2013.01); *G05D 1/0297* (2013.01)

(58) Field of Classification Search
CPC ...... G05B 19/0423; G05B 2219/21116; G05B 19/4185; G01N 35/00871; G01N 2035/00881
See application file for complete search history.

(56) References Cited

U.S. PATENT DOCUMENTS 6,513,058 B2  1/2003  Brown et al.
7,340,379 B2  3/2008  Kunkel et al.
(Continued)

FOREIGN PATENT DOCUMENTS

CN    106502095 A    3/2017
EP      1772746 A1   4/2007
(Continued)

OTHER PUBLICATIONS

International Search Report/Written Opinion in related/corresponding PCT Application No. PCT/US2018/062196 dated Feb. 15, 2019.

*Primary Examiner* — Rachid Bendidi
(74) *Attorney, Agent, or Firm* — Patent Portfolio Builders PLLC

(57) ABSTRACT

A central controller for robotics and connected devices includes a first communication interface configured to receive data from a plurality of robots or connected devices, at least some of which plurality of robots or connected devices are of different types. The data generated by robots or connected devices of different types are generated in different native data formats. The central controller also includes a processor configured to translate said received data from the different native data formats into a common protocol format, a storage framework configured to store the
(Continued)

data translated into the common protocol format; and a second communication interface configured to transmit commands based on data stored in the common protocol format and translated to the native data format of one or more of the plurality of robots or connected devices.

12 Claims, 10 Drawing Sheets

(51) Int. Cl.
  *G05D 1/00* (2006.01)
  *G05D 1/02* (2020.01)

(56) References Cited

U.S. PATENT DOCUMENTS

| | | | |
|---|---|---|---|
| 8,073,564 B2 * | 12/2011 | Bruemmer | G05D 1/0027 |
| | | | 700/245 |
| 8,463,436 B2 | 6/2013 | Jeong et al. | |
| 8,467,963 B2 | 6/2013 | Chen et al. | |
| 8,631,063 B2 | 1/2014 | Helal et al. | |
| 9,094,304 B2 * | 7/2015 | Shepherd | H04L 41/0816 |
| 9,146,558 B2 | 9/2015 | Field et al. | |
| 9,195,233 B2 | 11/2015 | Perrone | |
| 9,307,368 B1 | 4/2016 | Bartlett | |
| 9,308,643 B2 | 4/2016 | Dooley et al. | |
| 9,323,250 B2 * | 4/2016 | Wang | G05D 1/0214 |
| 9,420,741 B2 | 8/2016 | Balutis et al. | |
| 9,436,172 B2 | 9/2016 | Schmitz et al. | |
| 9,436,186 B2 | 9/2016 | Oh et al. | |
| 9,538,578 B1 | 1/2017 | Stamatakis et al. | |
| 9,592,609 B2 | 3/2017 | LaFary et al. | |
| 9,701,018 B2 | 7/2017 | Linnell et al. | |
| 2001/0032268 A1 | 10/2001 | Brown et al. | |
| 2008/0009969 A1 | 1/2008 | Bruemmer et al. | |
| 2008/0133052 A1 | 6/2008 | Jones et al. | |
| 2012/0271590 A1 | 10/2012 | Sakhare et al. | |
| 2013/0304882 A1 | 11/2013 | Shepherd et al. | |
| 2013/0325244 A1 | 12/2013 | Wang et al. | |
| 2014/0324271 A1 | 10/2014 | Oh et al. | |
| 2014/0380264 A1 | 12/2014 | Misra et al. | |
| 2015/0192439 A1 | 7/2015 | Mihelich et al. | |
| 2016/0196700 A1 | 7/2016 | O'Neil et al. | |
| 2017/0111714 A1 | 4/2017 | Gallo et al. | |
| 2017/0173784 A1 | 6/2017 | Shah et al. | |

FOREIGN PATENT DOCUMENTS

| | | |
|---|---|---|
| WO | 2013059513 A1 | 4/2013 |
| WO | 2016150500 A1 | 9/2016 |

* cited by examiner

MAP-BASED FRAMEWORK FOR THE INTEGRATION OF ROBOTS AND SMART DEVICES

RELATED APPLICATION

This application is a U.S. National Stage Application of International Application No. PCT/US2018/062196, filed on Nov. 21, 2018, which is related to, and claims priority from, U.S. Provisional Patent Application No. 62/589,089, entitled "MAP-BASED FRAMEWORK FOR THE INTEGRATION OF ROBOTS AND SMART DEVICES" to Gregory P. Scott and Karoline P. Pershell, the disclosure of which is incorporated here by reference.

TECHNICAL FIELD

Embodiments of the subject matter disclosed herein generally relate to methods and systems for allowing users to monitor, control and report on a deployed fleet of robots and smart devices.

BACKGROUND

There currently is no standardized software language or communication protocols for robotics systems and smart devices, making it difficult for end-users to deploy a variety of robotics systems from different manufacturers. To address this, the industrial sector (e.g., auto manufacturing) employs robotics integration companies to build customized software to control robots from multiple manufacturers, often at the cost of millions of dollars. For example, Ford Motor Company may hire an integration company to develop software to coordinate activities of a dozen welding arms and conveyers from disparate manufacturers into a single assembly line.

In the service sector (e.g. hospitality, custodial, medical) which does not use robotics to perform repetitive actions on a large scale, customized software is cost prohibitive. As such, the service sector has not been able to take advantage of the growing variety of service robotics systems as anything more than single robot deployments. For example, consider the custodial sector: although an essential service, this sector is under constant pressure to reduce costs because janitorial services add no direct commercial value to an organization. In the U.S., industry cost for contract building cleaning services hit $65.4 billion in 2017 (including contract and personnel management, but neglecting in-house custodial staff). A mere 5% increase in efficiency would result in $3.2 billion in savings annually that could be re-invested into the companies.

Further, the custodial sector is rife with robots from disparate manufacturers, as well as custodial managers without the expertise to employ multiple, specialized robotics systems. In 2014, the service robotics industry was valued at $3.77 billion with more than 24,000 units sold for professional use. These systems include (but are not limited to) large vacuuming and scrubbing robots from companies like Intellibot, Avidbot and Clean Fix; small vacuuming and mopping robots from iRobot and Neato environmental monitoring robots from Ecovacs; security robots from Knightscope and RoboteX. Additionally, there is a great variety of Internet of Things (IoT) sensors from hundreds of manufacturers, including sensors from Measurement Computing, Wicked Device, Monnit and Senseware; intelligent bathroom dispensers from Hagleitner, Tork and Pure and tracking beacons from Estimote and BluVision to name only a handful of examples. Unfortunately, every one of these robots and many smart devices run on their own software and are not designed to share information across a common framework.

Accordingly, it would be desirable to provide an integrated facility management hardware portal that allows end-users to monitor, control, and report on a deployed fleet of robots and smart devices as they transmit data about themselves and their environment, in a form consistent with the service industry.

SUMMARY

According to an embodiment, a central controller for robotics and connected includes a first communication interface configured to receive data from a plurality of robots or connected devices, at least some of which plurality of robots or connected devices are of different types. The data generated by robots or connected devices of different types are generated in different native data formats. A processor is configured to translate the received data from the different native data formats into a common protocol format. A storage framework is configured to store the data translated into the common protocol format. A second communication interface is configured to transmit commands based on data stored in the common protocol format and translated to the native data format of one or more of the plurality of robots or connected devices.

According to another embodiment, a method for controlling robots or connected devices of different types includes the steps of receiving data from a plurality of robots or connected devices, at least some of which plurality of robots or connected devices are of different types; wherein data generated by robots or connected devices of different types are generated in different native data formats; translating said received data from the different native data formats into a common protocol format; storing the data translated into the common protocol format; and transmitting commands based on data stored in the common protocol format and translated to the native data format of one or more of the plurality of robots or connected devices.

According to another embodiment, a robotics deployment of a plurality of robots and connected devices system includes a first robot having a first type of sensor configured to detect a parameter and a second robot having a second type of sensor configured to detect said parameter, wherein said first type of sensor is different than said second type of sensor. The deployment also includes a central controller which receives data associated with said detected parameter from both said first robot and said second robot and which is further configured to translate said data received from said first robot from a first native data format into a common central controller protocol and to translate said data received from said second robot from a second native data format into said common central controller protocol, wherein said first native data format is different than said second native data format.

According to another embodiment a multi-device control interface for controlling a plurality of robots and connected devices, comprising a user interface, includes at least one display window for each of the plurality of devices, the at least one device display feature illustrating one or more conditions of a respective one of the plurality of devices; at least one device command window for each of the plurality of devices, the at least one device command feature configured to receive one or more commands for sending to the respective one of the plurality of devices; a multi-device common window comprised of a fusion of information representing a collaborative workspace between at least one user and more than one concurrently operating device of the plurality of devices, the collaborative workspace including map information added by the at least one user and map information received from the more than one concurrently operating robots of the plurality of devices and configured for presenting the fusion of information as a coherent picture of an emerging map of an environment of the plurality of devices, including overlay of any data collected by the plurality of devices for display on the emerging map of an environment; and a multi-device common window comprised of a fusion of information representing information and insights captured from across more than one concurrently operating device of the plurality of devices through statistical analysis, machine learning, and/or big data analytic techniques, and displayed in a manner most appropriate for the information collected, such as through raw numbers, tables, charts, overlays to maps.

According to an embodiment, a robotics system comprises a first robot having a first type of humidity sensor as one of its perceptors, a second robot having a second type of humidity sensor, and a third type of humidity sensor that is not built into a robot, but is a stand-alone sensor mounted to a wall, wherein the first type of humidity sensor is different than the second type of humidity sensor and both are different from the third type of humidity sensor. The robotics system further comprises a central controller (either cloud-based or locally deployed) which receives humidity data from both the first and second robots and the third stand-alone sensor via first, second and third application programming interfaces (API), respectively. The first API translates the humidity data received from the first robot from a first native data format into a common central controller protocol. The second API translates the humidity data received from the second robot from a second native data format into the common central controller protocol. The third API translates the humidity data received from the third stand-alone sensor from a third native data format into the common central controller protocol. Data from both robots and the stand-alone sensor are stored in the common central controller protocol format.

BRIEF DESCRIPTION OF THE DRAWINGS

The accompanying drawings, which are incorporated in and constitute a part of the specification, illustrate one or more embodiments and, together with the description, explain these embodiments. In the drawings.

DETAILED DESCRIPTION

Figure 1:
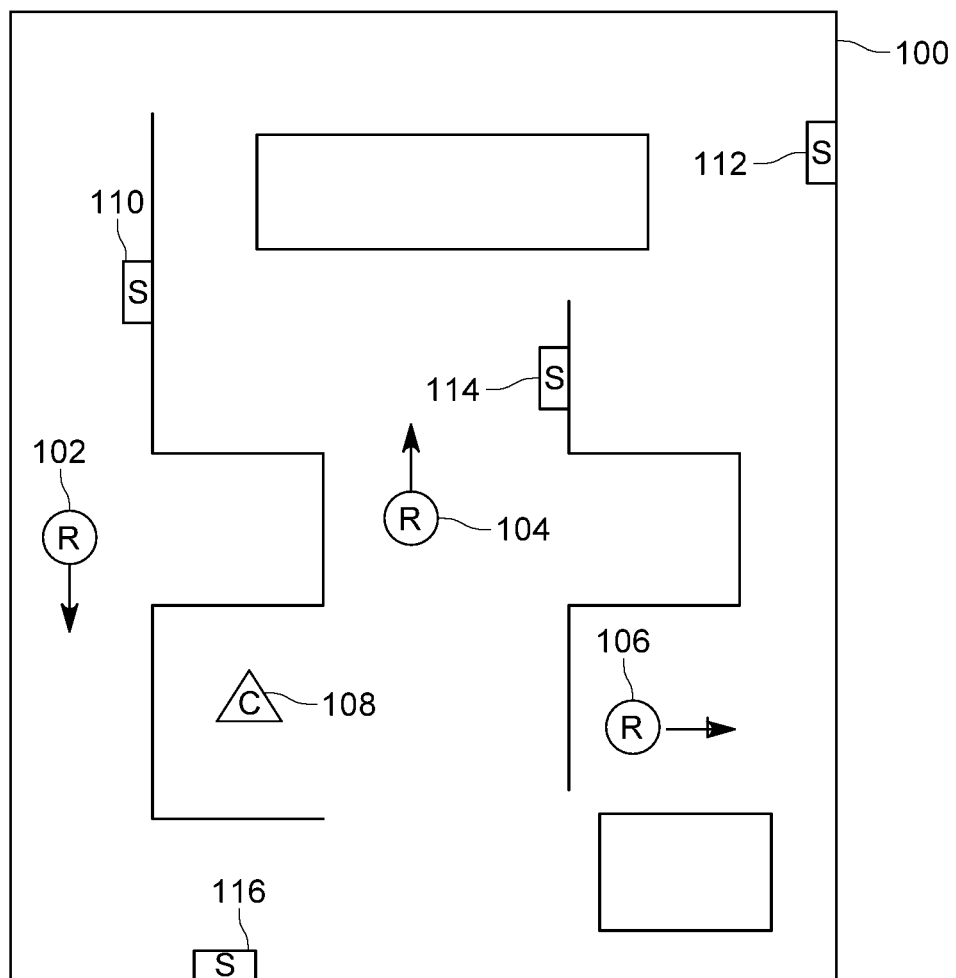
FIG. 1 depicts an exemplary top view of a facility wherein a plurality of robots and connected devices or sensors have been deployed.

The following description of the embodiments refers to the accompanying drawings. The same reference numbers in different drawings identify the same or similar elements. The following detailed description does not limit the invention. Instead, the scope of the invention is defined by the appended claims. The embodiments to be discussed next are not limited to the configurations described below but may be extended to other arrangements as discussed later.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

As mentioned above, when implementing robotic systems, systems using smart sensors, or both, it would be desirable to provide an integrated management system that allow users to monitor, control and report on a deployed fleet of robots and smart devices as they report on data about themselves and their environment. Additionally, with such an integrated robotic management system in place, it then becomes feasible to utilize the fleet of robots and smart devices, many of which may be quite different from one another in terms of how they collect and communicate data about themselves and their environment, to use the fleet containing both mobile robots and static devices to gather various types of data, homogenize the data, and use the homogenized data to create different types of maps associated with their operating area (e.g., a humidity distribution map across a floor of a building). These maps can then, according to other embodiments, be used as inputs to data analytic systems to generate practical scenarios for controlling resource utilization within that operating environment (e.g., reduce cleaning efforts by human and/or robotic cleaners in areas which have recently been less used or entirely unused). In this text, reference is thus made to robots, smart sensors and other connected devices of "different types". In this context, "different types" refers to robots, smart sensors and other connected devices which are, for example, made by different manufacturers, or are made by the same manufacturer but are of different hardware models or versions, or are made by the same manufacturer but use different data formats/protocols and or commands to communicate information, such that when they are integrated into a particular system, such as system will benefit from the embodiments described herein.

According to an embodiment, a map-based software and hardware framework is provided that can quickly and easily link the smart hardware at a work site (e.g., vacuuming robots and mold sensors) and provide a dashboard that allows users (e.g., custodial managers) to task and monitor all connected hardware in their facility. Although this embodiment is described in the context of custodial services, those skilled in the art will appreciate that the concepts associated with this embodiment are broadly applicable and can be applied to a wide array of other service sectors.

This software framework serves as a universal receptor for service robotics systems and smart devices (also referred to herein as "connected devices" which can be mounted in a fixed, stationary position or mounted to a robot). This framework takes in data from each individual robot or sensor, shares key components from that aggregated information across the fleet of deployed hardware, and controls their movements, schedules or responses. Expanding beyond robots, the central controller according to this embodiment will be flexible enough to integrate any connected device, such as smart sensors (e.g., temperature sensors and smoke detectors) or other smart dispensers (e.g., bathroom soap and paper towel dispensers). All components will be part of the same working ecosystem that can be controlled and monitored from a single dashboard.

FIG. 1 illustrates a top-down view of an operating area 100 for an integrated robotics and smart sensor system. Therein three different robots R 102, 104 and 106 are capable of moving about the operating area 100 where the central controller 108 calculates and transmits location, schedule and action to be taken. The operating area 100 also includes a plurality of smart sensors S 112-116 which can also be homogeneous or heterogeneous. Alternatively, those skilled in the art will appreciate that two or more of the robots 102-106 and smart sensors 112-116 can be the same type of robot or smart sensor, however in order to illustrate the manner in which robotic systems according to these embodiments are able to integrate different types of devices, different types of robots are used in the illustrative examples herein. The other lines and shapes illustrated in FIG. 1 represent walls and other obstacles disposed within operating area 100.

Figure 2:
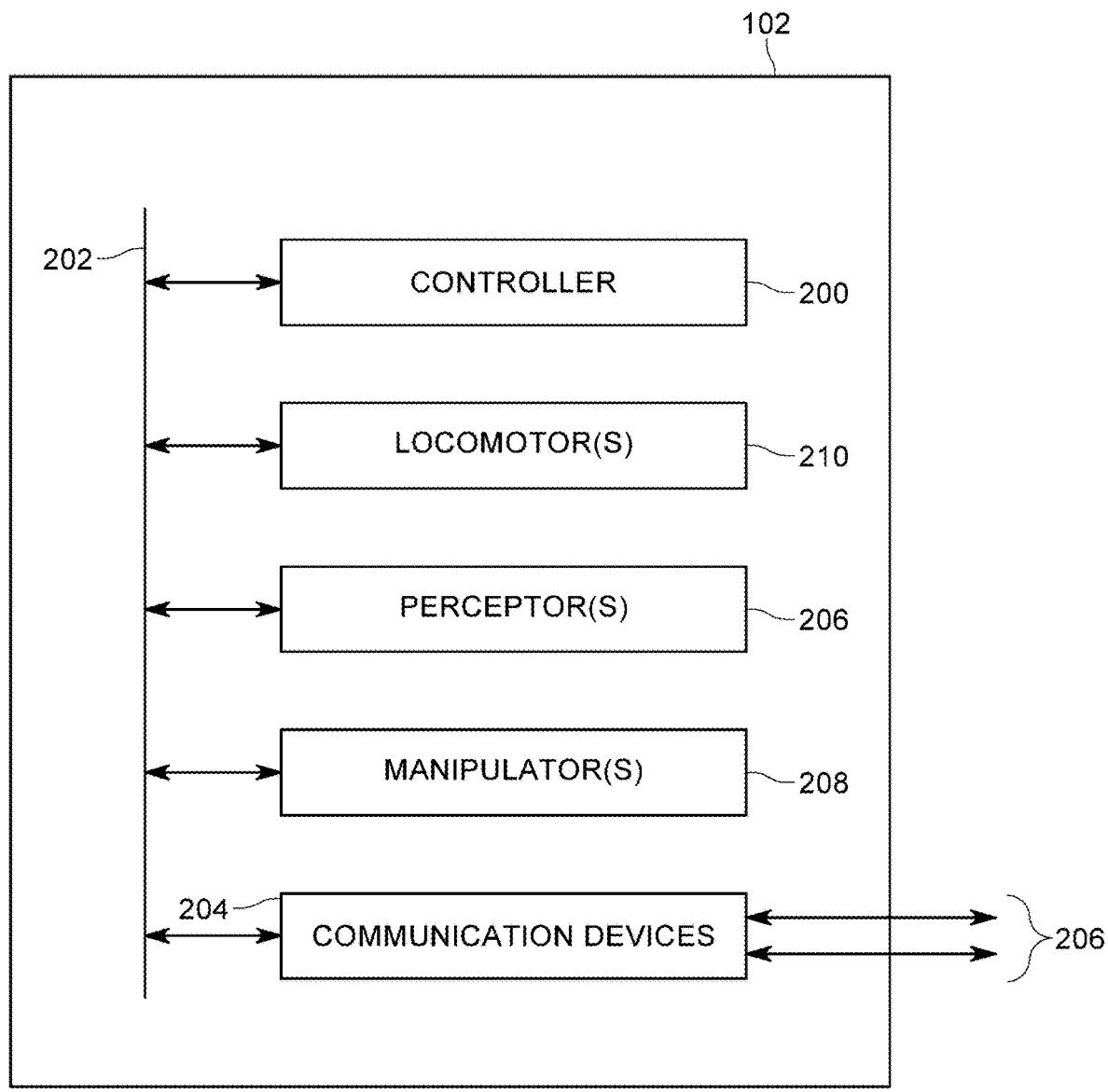
FIG. 2 is a block diagram illustrating various structural elements associated with a robot.

The robots 102-106 can perform operations which, for example, might otherwise be performed by humans. In the context of custodial services, this might include vacuuming, for example. An exemplary (but non-limiting) high level architecture of a robot 102 is shown in FIG. 2. Therein, the robot 102 may include, for example, a controller 200 including a system bus 202 which communicatively couples the controller 200 to: (1) one or more communication devices 204 which enable communications with other devices via communications channels, (2) one or more perceptors 206, (3) one or more manipulators 208, and (4) one or more locomotors 210. The communication channels 206 may be adaptable to both wired and wireless communication, as well as supporting various communication protocols. By way of example and not limitation, the communication channels 206 may be configured as serial and/or parallel communication channels, such as, for example, USB, IEEE-1394, 802.11, BLE, cellular (e.g., LTE or 5G), and other wired and wireless communication protocols. If wireless communication channels are used, then the communication devices 204 will include a wireless transceiver and antenna (not shown in FIG. 2).

The perceptors 206 may, for example, include any number of different sensors such as: optical sensors, inertial sensors (e.g., gyroscopes, accelerometers, etc.), thermal sensors, tactile sensors, compasses, range sensors, sonar, Global Positioning System (GPS), Ground Penetrating Radar (GPR), lasers for object detection and range sensing, imaging devices, magnetometers and the like. A perceptor could also be any other existing sensor within a deployment, that would otherwise be static, but could be mounted onto a robot to get the same data distributed across a facility, instead of from a single location (e.g., temperature or humidity sensors).

Furthermore, those skilled in the art will understand that many of these sensors may include both a source and a sensor to combine sensor inputs into meaningful, actionable perceptions. For example, sonar perceptors and GPR may generate sound waves or sub-sonic waves and sense reflected waves. Similarly, perceptors including lasers may include sensors configured for detecting reflected waves from the lasers for determining interruptions or phase shifts in the laser beam. Imaging devices may be any suitable device for capturing images, such as, for example, an infrared imager, a video camera, a still camera, a digital camera, a Complementary Metal Oxide Semiconductor (CMOS) imaging device, a charge coupled device (CCD) imager, and the like. In addition, the imaging device may include optical devices for modifying the image to be captured, such as: lenses, collimators, filters, and mirrors. For adjusting the direction at which the imaging device is oriented, a robot 102 may also include pan and tilt mechanisms coupled to the imaging device.

The manipulators 208 may include, for example, vacuum devices, magnetic pickup devices, arm manipulators, scoops, grippers, camera pan and tilt manipulators, individual or coupled actuators, and the like. The locomotors 210 may include, for example, one or more wheels, tracks, legs, rollers, propellers, and the like. For providing the locomotive power and steering capabilities, the locomotors 210 may be driven by motors, actuators, levers, relays and the like. Furthermore, perceptors 206 may be configured in conjunction with the manipulators 208 or locomotors 210, such as, for example, odometers and pedometers.

The foregoing discussion of FIG. 2 and hardware associated with a typical robot was adapted from U.S. Pat. No. 8,073,564 (hereafter the '564 patent), the disclosure of which is incorporated here by reference. Those skilled in the art will appreciate, however that such elements are purely exemplary. Some robots will not include all of the elements illustrated in FIG. 2, whereas other robots may include hardware elements which do not fall into the categories depicted in FIG. 2.

Smart sensors 110-116 will typically have a subset of the hardware elements associated with robots 102-106. For example, smart sensors 110-116 may not typically include manipulators 208 and locomotors 210, but may include a controller 200, one or more perceptors 206 and one or more communication devices 204.

Figure 3:
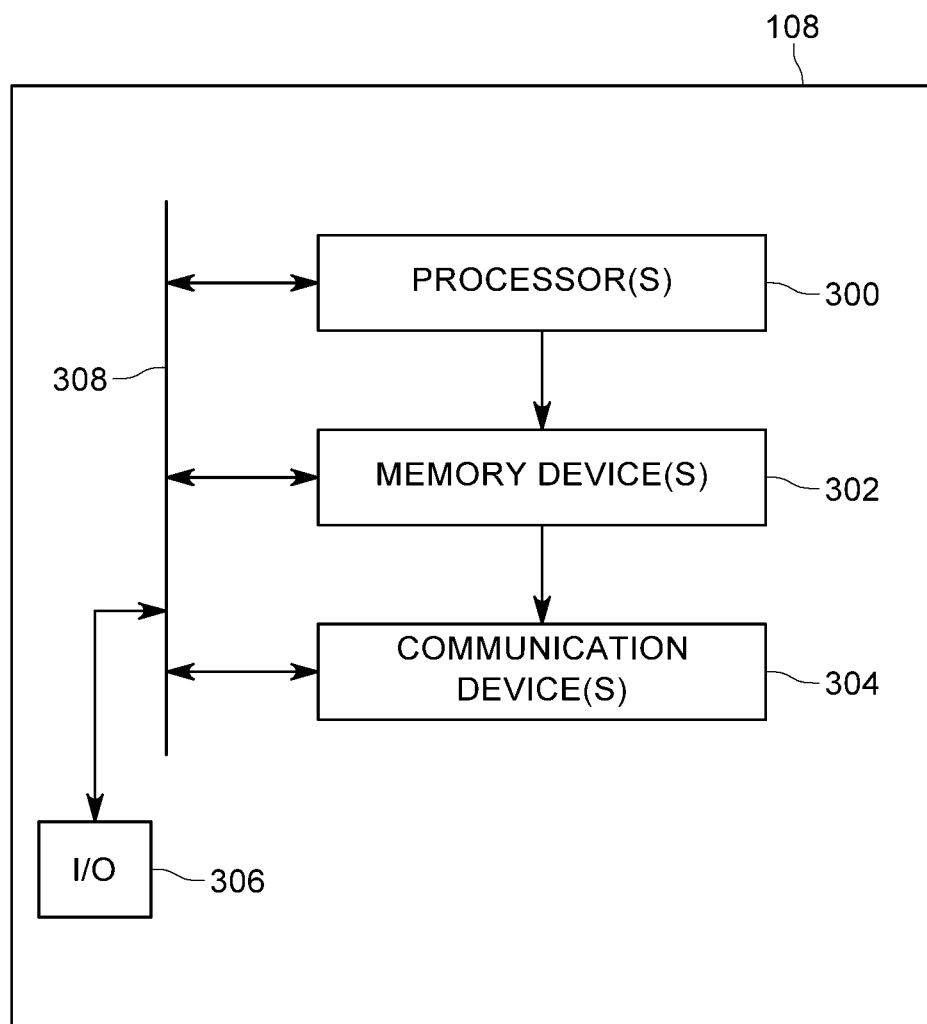
FIG. 3 is a block diagram illustrating various structural elements associated with a central controller for robots and devices or sensors.

Similarly, the central controller 108 for controlling the robots 102-106 and smart sensors 110-116 will also include various hardware elements as shown in FIG. 3. According to these embodiments, the central controller 108 is where device data is stored system decisions are made. More specifically, decisions, artificial intelligence, machine learning, data analytics, and basic deduction are performed in the central controller 108 to pull together all the data from all the connected devices, make sense of it all, and recommend or automate actions based on that data. The central controller 108 can be located in the cloud, locally deployed in or near to the operating area or a hybrid system including both.

Therein, central controller 108 includes one or more processors 300, one or more memory devices suitable for storing data, software or application code, one or more communication devices 304, including either wired or wireless communication capabilities, one or more input/output (I/O) devices 306 and a communication bus 308 to interconnect these various hardware elements. As mentioned above, embodiments described herein provide for an integrated communication and control of disparate robots 102-106, smart sensors 110-116, and other devices by providing, in central controller 108, which takes in data from each individual robot and sensor, shares that information across the fleet, and controls their movements and operations.

Figure 4:
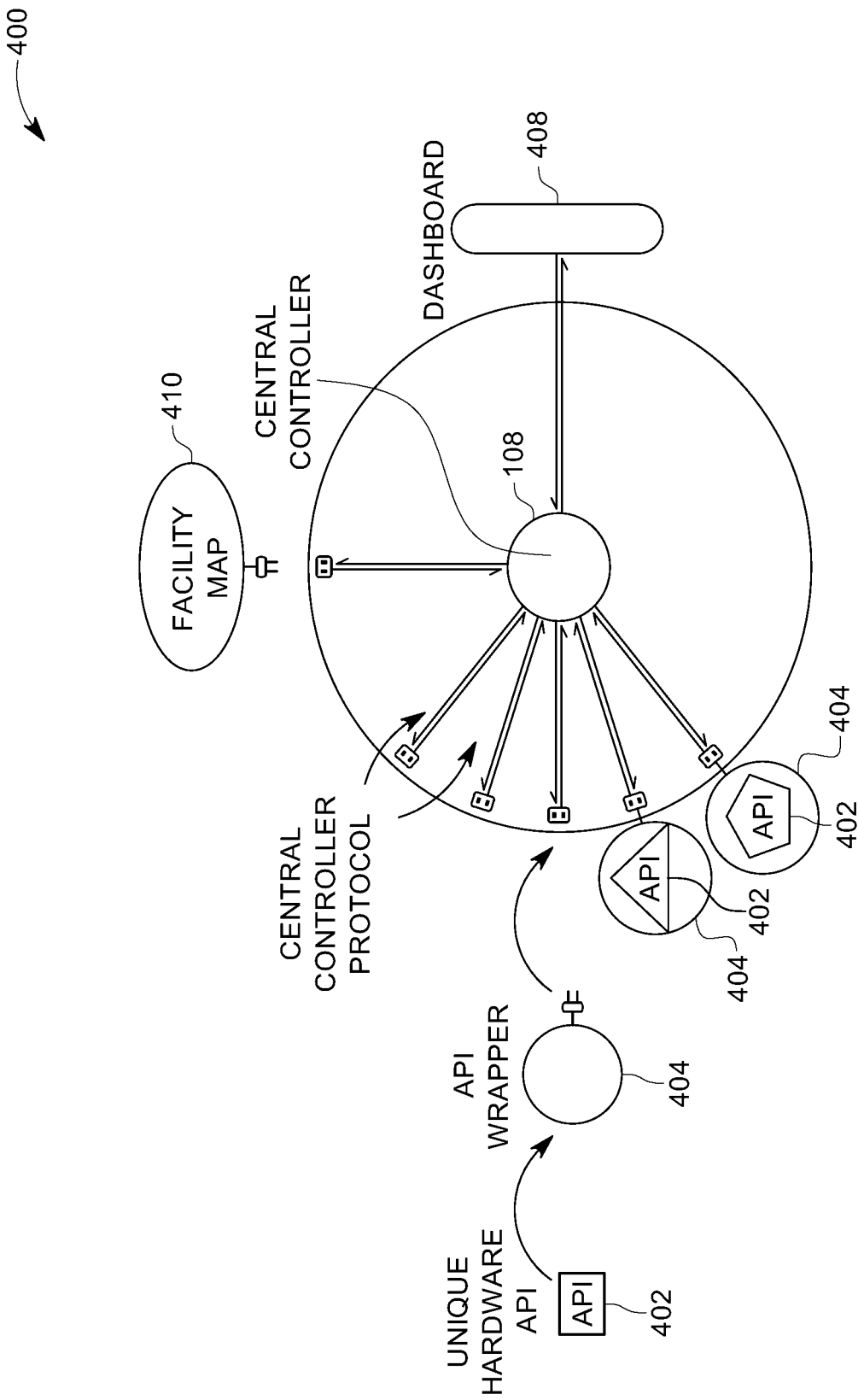
FIG. 4 depicts an integrated system of connected devices according to an embodiment.

A high-level example of such a system 400 is illustrated in FIG. 4. Therein, each piece of hardware (i.e., robot or sensor) in the system has a unique API 402 that sends and receives data through its own, typically proprietary, communication protocol. By creating an API wrapper 404 for each unique piece of hardware, the robots and sensors having disparate communication protocols, as well as disparate idiosyncrasies with respect to other hardware related parameters (e.g., calibration, normalization, output range, input range, bias effects, etc., of the preceptor(s) 206, manipulator(s) 208, and/or locomotor(s) 210), can be plugged into the central controller 108, so all devices are integrated, sharing the same data, dashboard 408, and facility map 410 of the operating area 100, where the dashboard 408 and facility map 410 are non-limiting examples of possible I/O functions that consume the data stored by the central controller 108 in the common central controller protocol.

Thus, the API wrappers 404 both translate the data being provided by the robot 102-106 or smart sensor 110-116 from its native, proprietary protocol or format into a common central controller protocol and, when needed, adjusts the data values themselves to account for the unique hardware idiosyncrasies mentioned above to provide consistent data across the fleet. For example, if robot 102 deploys a first type of humidity sensor as one of its preceptor(s) 206 and robot 104 deploys a second, different type of humidity sensor (e.g., different manufacturer with the same humidity sensing technology, or just different humidity sensing technology), then the API wrappers 404 associated with robot 102 and robot 104 could include transformation algorithms or calibration factors which change the sensed humidity values transmitted from either or both of robots 102 and 104 such that the humidity data stored by the central controller 108 in memory device(s) 302 is consistent.

According to an embodiment, the common central controller protocol can, for example, take the following exemplary format (using, purely as an example, a common central controller protocol data unit capturing information about the cleaning distance traveled by a robotic vacuum cleaner or other robotic cleaning device):

as well as commands which need to be transmitted to the smart sensors and robots. An example of such a common central controller protocol is attached hereto as Appendix A. Note that the data element exemplified above can be found in Appendix A in the row numbered based on the Id value, i.e., 60121.

To better understand how the provision of a common central protocol for data management in robotics systems according to these embodiments enhances robotics systems applications, consider the following illustrative example. Suppose that a facility has a humidity device 1 which is a static device mounted to a wall at a specific (x,y,z) location on the facility map. Humidity device 1 has a single sensor and returns values in percent with one significant digit and has no onboard calibration to adapt to sensor deterioration over time (ex: 35.4%, 0 calibration). The facility also includes a humidity device 2, mounted to the back of a robot that drives around the facility (this robot may also vacuum, or make deliveries within the building as its primary function), which makes it a mobile humidity monitoring device. Humidity device 2 captures humidity through two onboard humidity sensors and onboard calibration values that allow for adapting to deteriorating sensors over time. Both onboard sensors utilize the calibration value to get an accurate reading and are averaged together to get an even more precise result (ex: 35.45% with +0.08% calibration and 36.56% with −0.06 calibration, resulting in 35.53% & 36.50%=36.02% humidity). The system 400 stores the raw humidity values and existing calibration values in the relational database 502, in order to make sure sensors are providing proper information, and also adds its own calibration value to sensors that do not have them onboard, to ensure the most accurate readings. As the mobile humidity sensor passes nearby the wall-mounted humidity sensors, cross-device calibration can be conducted by the central controller using machine learning or data analytics algorithms. The central controller recognizes that the first humidity sensor has no ability to perform onboard calibrations, but can decide whether or not the calibration values on the mobile humidity sensor need to be updated remotely, and can send those updates directly to the device as required.

Figure 5A:
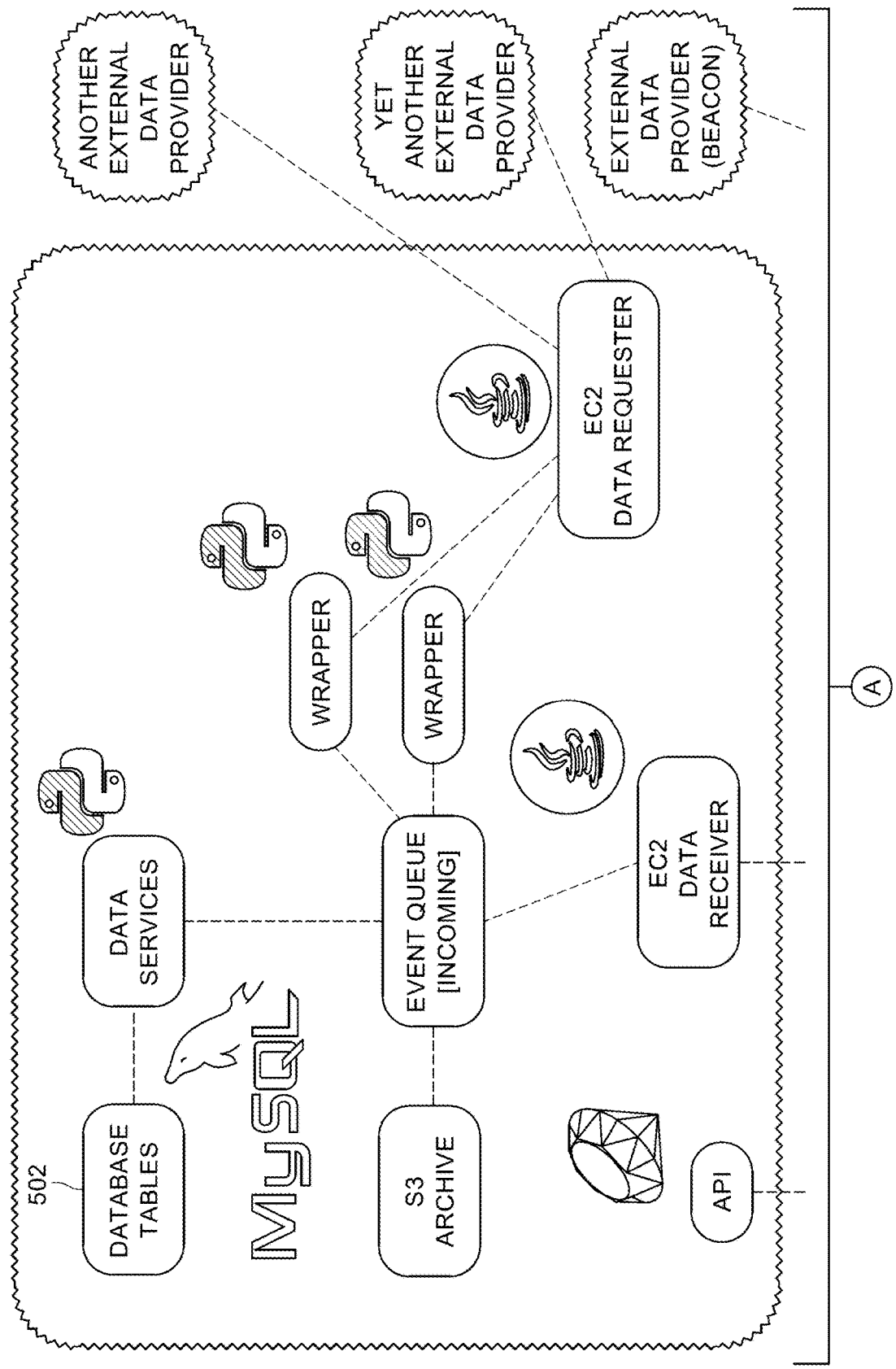
FIGS. 5A and 5B depict an integrated system of connected devices from a data perspective according to an embodiment.
Figure 5B:
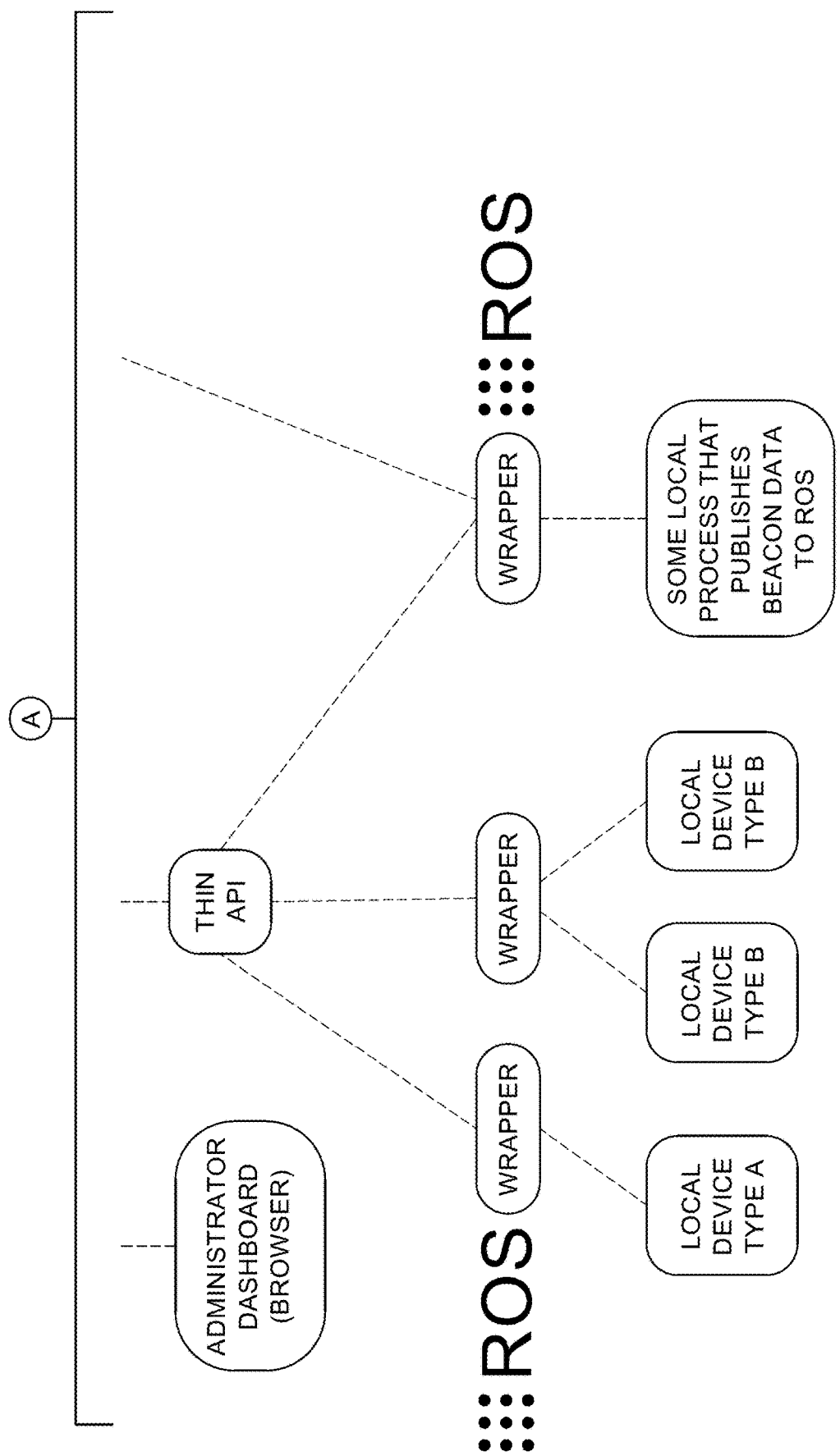

```
{
    "id": "60121",
    "type_name": "cleaning_distance",
    "data_type": "double",
    "data_units": "meters",
    "display_name": "Distance cleaned during this current task",
    "description": "This represents the distance in meters that the robot traveled while operating in cleaning mode"
}
``` where the id value is a numerical identifier for this particular data element in the protocol, the type_name value is a short textual name for the data element, the data_type value is one of a predetermined set of value types that the stored value for this particular data element will take, the data_units value is the measurement used to capture the collected data, the display_name is a value that can be displayed (e.g., on the dashboard 408), and the description value can be a longer text description of the data element having various uses. In order to provide for a comprehensive capability to capture and homogenize data received from disparate smart sensors and/or robotic devices, a common central controller protocol needs to have a library of data elements which cover the gamut of different values which can be received from all of the different smart sensors or robots in a particular system, According to an embodiment, the system 400 can be implemented as a hybrid software architecture split between the cloud and a local server. The local server controls all robots and actions that require near-realtime control (e.g., object localization, robot navigation, emergency device shutdowns, building alarms). The cloud server stores and processes all non-realtime data and information from all devices, where it is accessed for back-end analytics, data display on a dashboard, data reports, or schedule planning. FIGS. 5A and 5B show the architecture and arrangement of various aspects of the system 400's architecture according to an embodiment, e.g., which components communicate with each other, and which components are located locally or on the cloud. The representative software frameworks used here in the diagram are interchangeable with other existing software frameworks that provide similar capabilities, so the architecture is flexible to use a variety of inputs and outputs that communicate via formatted data (e.g. JSON, XML, or the like). Note that the example illustrated in FIGS. 5A and 5B is not a structural requirement and these embodiments are not limited to the specific software frameworks displayed therein.

Figure 6A:
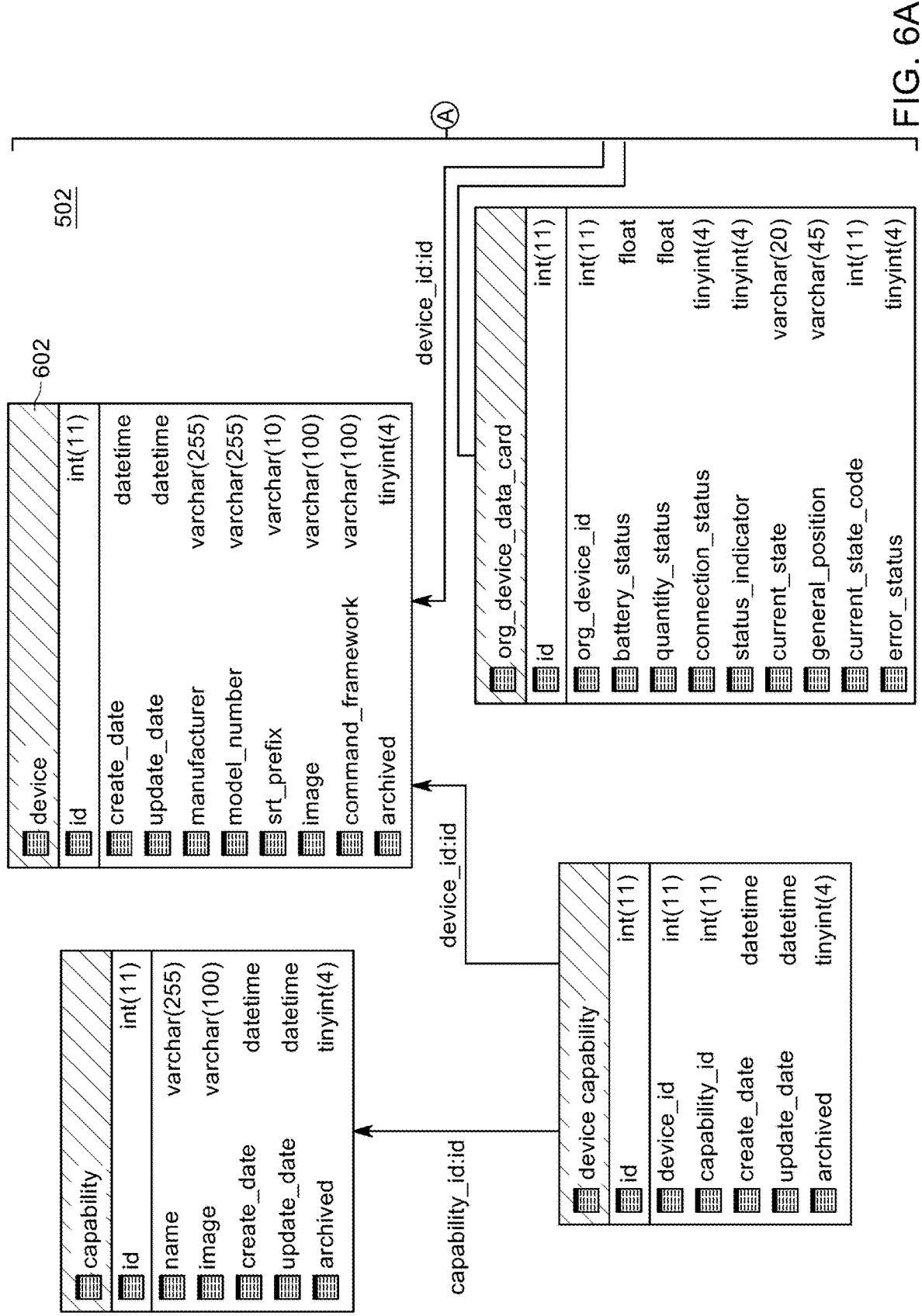
FIGS. 6A-6C depict a relational database according to an embodiment as shown in FIGS. 5A and 5B in more detail.
Figure 6B:
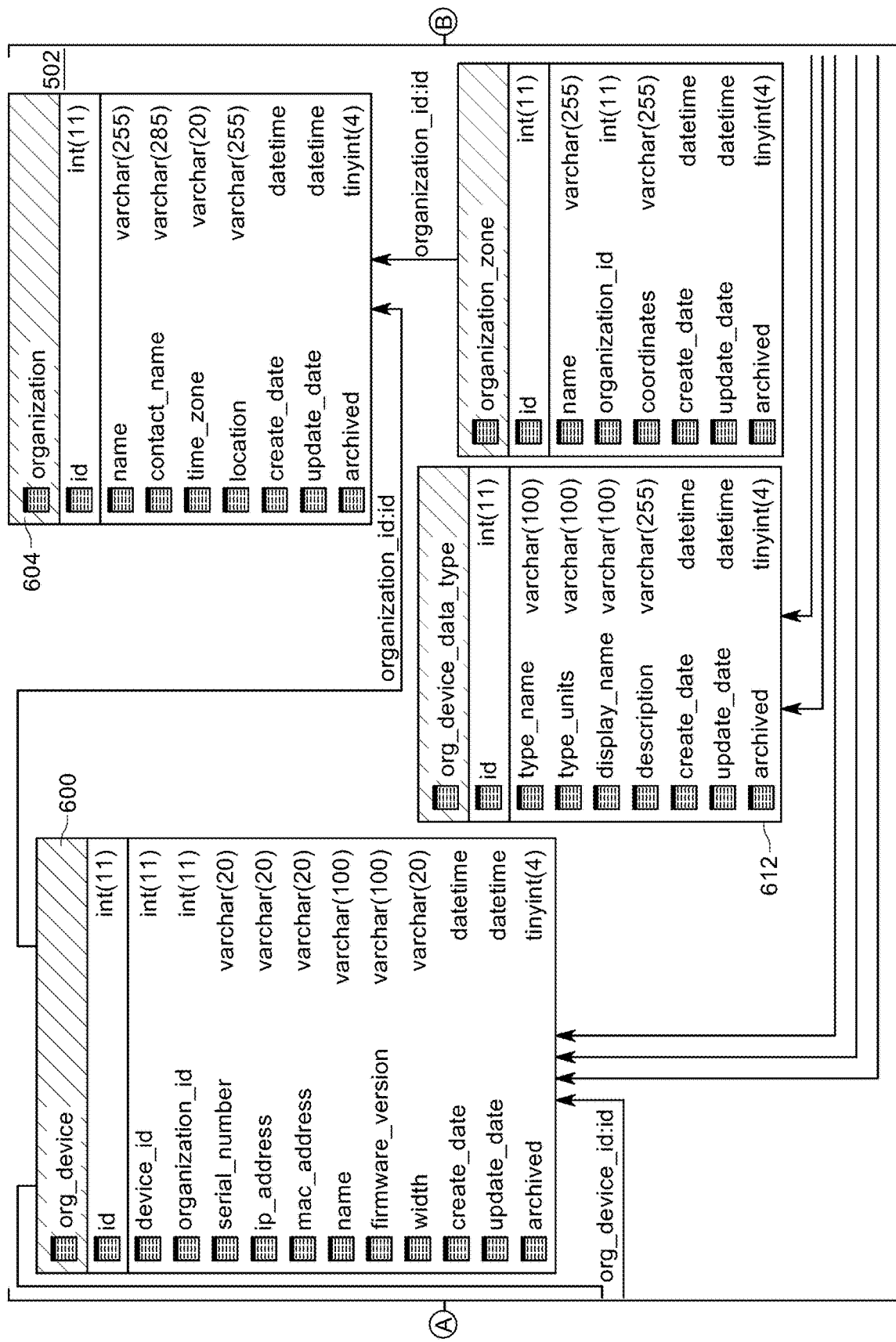
Figure 6C:
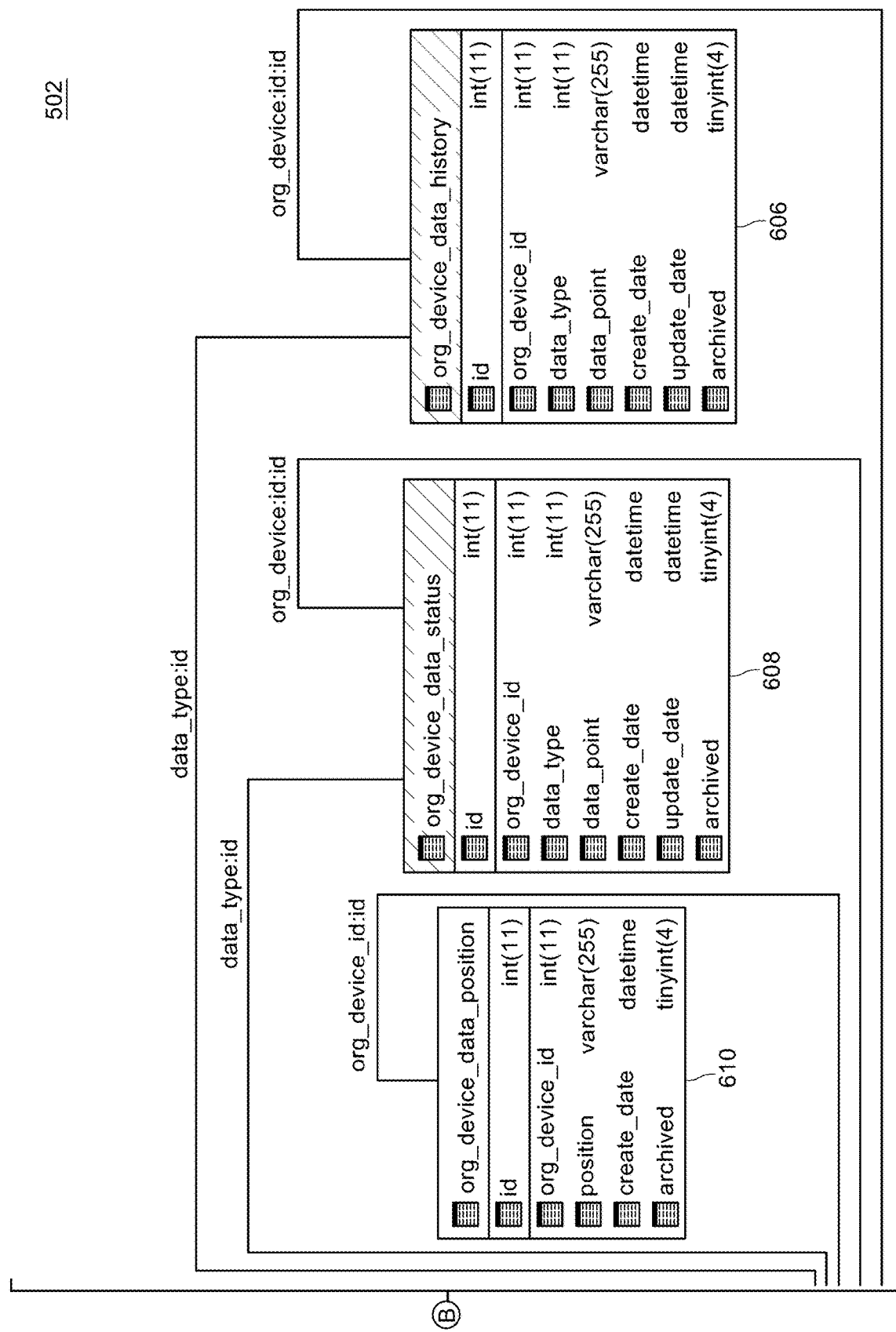

An example of the database tables 502 in FIGS. 5A and 5B used by the system 400 according to an embodiment is illustrated in FIGS. 6A-6C. The relational database 502 is an ever-evolving data management structure that stores all data collected by all devices in all deployments. The relational database can be set up in the cloud, and serves as an easily referenced filing cabinet for device data. This allows users to sort data as needed, such as by facility where the devices are deployed (e.g., what a custodial manager would want to know); or by device, meaning you look at all make and model of a specific type of hardware (e.g., what a hardware manufacturer may want to know).

This organization-centric structure requires that all devices (captured in org_device table 600) be of a specific type (specific manufacturers and model numbers, denoted in the device table 602) and assigned to a specific organization (organization table 604). The device table 602 captures the generic data requirements and capabilities of each specific type of device (i.e., brand and model of a sensor, dispenser or robot). Only existing types of devices from the device table 602 can be deployed to a facility. However, any type of smart device can be included in an organization as many times as desired, by pointing to this generic information of the device stored in the device table 602. Each generic device is then assigned device specific information (e.g. serial number, IP address, firmware version), and thus is made unique within the database at the org_device table 600. Each unique device in the relational database is allocated to one organization, using the organization's unique identifier.

This framework allows for plug-and-play components, meaning the addition or subtraction of devices from an organization will not require software development, but rather just a database update which assigns that unique device to a specific organization. Since each device is also facility-specific, meaning data is organized based on whom the recipient of the data is, this structure allows for administrators to review data across clients (to ask questions like, "What is the average charging time of all Roomba 960's?"), but eliminates the possibility of clients seeing data that is not their own.

From there, each individual instance of these org devices populates the subordinate tables with the data collected by them. For example, a complete history of this data is collected in the org_device_data_history table 606, where time-based reports can be built and a comparison between data across the lifetime of a device can be evaluated. The current status of all devices is stored in the org_device_data_status table 608. A history of all position data from where all devices are either installed or where they have moved through, are stored in the org_device_data_position table 610. These positions allow for the specific devices to be displayed at the correct locations on the map screen of the UI. Additionally, a collection of specific information that is evaluated from the collected data is stored on the org_device_data_card table 612, for display on the fleet overview screen of the UI. These tables are representational as the core components of the software, but additional database tables are built and in some cases data in these tables is duplicated from other tables, in order to provide fast calculations for the machine learning and big data analytics algorithms to be optimized.

Figure 7:
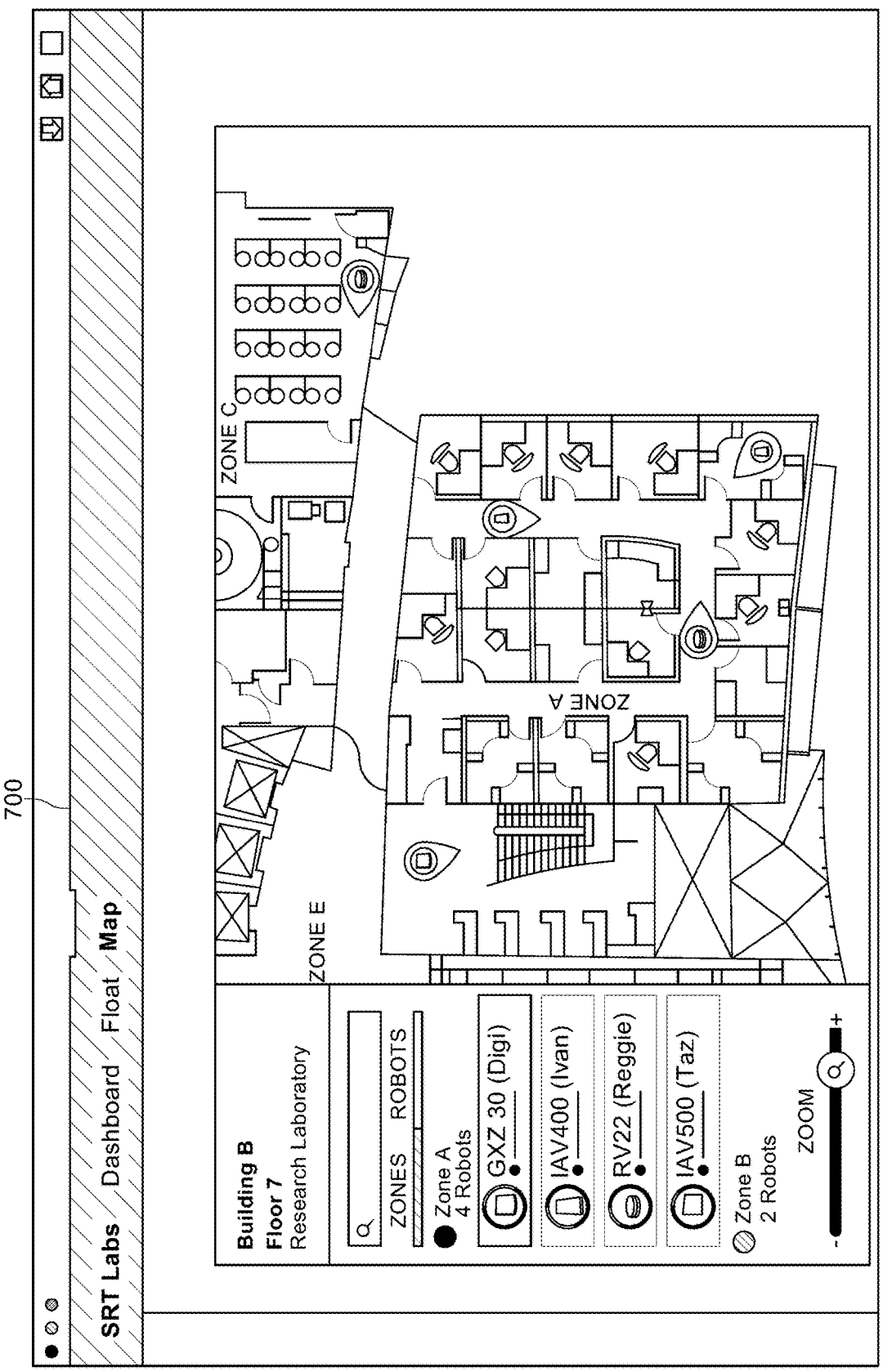
FIG. 7 illustrates a facility map with a representation of devices deployed within that facility.

For example, the dashboard 408 can include a map UI screen 700 as shown in FIG. 7, that uses the org_device_data_position table to show the current (or past) positions of the mobile robots and static devices in any particular organization. These UI screens can, for example, include a drag-and-drop map of the facility, the current location of all deployed robots, and a library of all robots waiting to be deployed (as seen in FIG. 7), and a fleet status overview and scheduling screen.

Within the database, the org_device_data_position table 610 is dedicated to capturing all device position data as Cartesian coordinates (x, y, z) and body rotation (roll, pitch, yaw), where the planar map only considers x and y coordinates and the rotation denoted by yaw. These position coordinates are in relation to the specific facility map and displayed with respect to the origin of that map. Stationary devices (e.g., environmental monitoring sensors) have static coordinates, whereas robots have dynamic coordinates, yet all devices store their coordinates in the org_device_data_position table 610. Given one specific facility, the system 400 pulls data from these position fields via a back-end API for all devices assigned to that facility, interpolates the data in between the position intervals stored on the table, and displays a moving trajectory (for dynamic devices, e.g., robots). The position data displayed on the dashboard is approximately 5 seconds delayed due to latency in the cloud transmission and data processing layer, but optimizations in data management and database architecture are constantly evolving to improve system efficiency.

From the dashboard 408, a collection of "cards" is displayed as a device fleet overview, one card for each deployed device. On the fleet overview, the thumbnail images of the devices, names, general locations, and active tasks being worked are displayed. Additionally, battery life or quantity of product remaining is displayed as a percentage in graphical form, and connection and error reporting status are also reported. Data displayed on these cards is updated at every instance that data is received from those devices. For different devices, data is transmitted at different rates. For example, environmental monitoring sensors may report temperature or humidity every 1 minute, while moving robot position data may be reported every 1 second. The most recent data point from each device is stored in the org_device_data_status table 608, while all previous data from each device is stored in the org_device_data_history table 606. Both can be referenced at any time to build reports and provide data analytics across devices within their facility.

Embodiments also provide for a web service which allows the user interface to query and update the database 502, and to pull data as required for display and reporting. Such data includes information about the organization, the map of the facility, the devices deployed within a facility, and actionable data the devices provide to the facility manager. Although the database illustrated in FIGS. 6A-C is a relational database, those skilled in the art will appreciate that these embodiments can be implemented with other types of databases or data storage structures.

Different API endpoints were created for different tables in the relational database and for different screens on the GUI. Some of these endpoints are read-only (e.g., the information displayed about each device on the Fleet screen), while other endpoints are read-and-write (e.g., the position data of a static device is readable so that it can be displayed on the map, but is also writeable for instances where that device is physically relocated to a different location). The write endpoints are much more detailed, and involve utilizing post, put, or delete HTTP commands to modify specific columns within specific tables. For example, the write endpoints for the API that will allow the user to update the current location of a device, will append a new row to the org_device_data_position table with the updated position for that specific device. When the read endpoint pulls a device's position data into the user interface, that API returns the most recent position of that device, allowing the new location to be properly displayed on the dashboard 408.

The robotic system embodiments described herein provide for a number of advantages and/or benefits including, but not limited to, enabling robotic system implementations which: create a scalable system to deploy numerous versions of the same robot across multiple facilities with no additional programming requirements (plug and play); incorporate hardware from disparate manufacturer's into the same system; combine robots and smart devices into the same monitoring and control framework; integrate data from each device to our cloud database in a common communication protocol so any single data point can be used as required across all devices, such as updating maps that are used by multiple devices; utilize the same localization and navigation algorithms on different mobile devices with different platform kinematics for individual and co-robot navigation; autonomously path plan a robot's trajectory from one point on the map to another; display on a user interface the data received about the health and sensor data of a diverse collection of devices; allow a Facility Manager to send commands to any deployed robot to stop its task and return to its charging station (and later to any point on the map to complete a task); display the locations of all devices within a facility on a robot-built facility map, and allow the Facility Manager to update the location of any device in the deployment; structure data storage and retrieval to allow for the development big data analytics using data from multiple device platforms.

Mapping of a facility within which a robotic system according to these embodiments operates has been briefly discussed above and is a significant enabler for these embodiments. Those skilled in the art will appreciate that there are a number of different ways in which to generate a facility map that can then be shared amongst the robots operating in the system, some of which are described in the above incorporated by reference '564 patent. According to some embodiments, robotic systems include a method for building and uploading a map of any facility to the cloud system. Utilizing the Robot Operating System (ROS) framework (e.g., as described at http://www.ros.org), embodiments employ a map-building robot which constructs a 2-dimensional map and 3-dimensional map using lidar, accurate robot odometry, stereo cameras, accelerometers, a variety of other onboard sensors, and an open source ROS package (e.g. gmapping). A variety of files and file structures are created during this process. In preparation for display of the map on the users' dashboard, two files are created to store a specific facility's map: a .PGM file, which is a grayscale probability grid referencing the likelihood of an obstacle being located at each point within that grid; and a .YAML file, which stores the origin and resolution data for that specific map. The map is stored on a local server within the facility where the devices are deployed. The map is also uploaded to an encrypted file store on the cloud from the local server when the local server is booted up, and referenced in the organization table, stored in map_uri.

Rather than having only a locally stored map, the system 400 utilizes a hybrid architecture for all mapping functions. The locally stored maps are used within the ROS installation to localize and navigate locally deployed robots to that map. Embodiments can also use cloud-based storage and processing systems (e.g., Amazon Web Services, Microsoft Azure) to store map files that are used for visualization of the localized robot positions on the user interface. Both maps are synchronized to ensure that the robots' positions on the ROS map are overlaid on the same map for the user display. When multiple maps are available for a given facility, the selected map is noted in the organization table of the relational database as the link stored in the map_uri, and used by both the local ROS server and the cloud-based UI display.

Embodiments further provide for a localization algorithm that allows a research robot to localize itself on an existing facility map. This localization algorithm is applicable to a variety of robots, in addition to the mapping robot. In order to integrate this algorithm into the central controller architecture, a hybrid data management system has been developed: all non-realtime data (such as device sensor data, where extended processing and storage time is acceptable) is processed on the cloud through the above-defined relational database, while all real-time data (such as localization and navigation, where robot response time is critical) is processed on a local server on the same network as the robots. As such, robots localize on the version of the map stored locally, while each robot's location is displayed on the user interface though the cloud-based map, at a few seconds delay. Alternatively, localization can be performed onboard the robot itself in order to improve system response time.

To further improve the robot's ability to localize, embodiments provide for the robotics system within the facility to incorporate beaconing hardware that gives off a wireless signal (e.g., Bluetooth, RFID, visual cues), the strength of which can be assessed by the robot to improve its localization. For example, Bluetooth beacons are used to track traffic patterns of personnel movement across a building, specifically which hallways, rooms, or areas are receiving no traffic, less traffic than average, or more traffic than average. Systems designed in accordance with these embodiments take this traffic pattern analysis and determines, for example, which hallways have received significant traffic compared to those that have received limited traffic. Central algorithms then analyze the traffic patterns to determine which areas of the building need cleaning or maintenance more or less than on a normal day of operations. Data through these algorithms will be used to automatically adjust the scheduler that assigns robots (or human personnel) specific cleaning duties so that the deeper cleaning tasks are allocated additional time, while the limited cleaning tasks are allocated less. In cases where zero traffic has been detected within an office or down a specific hallway, then the scheduler completely reallocates the robot (or human staff) away from that area, so as to focus on areas of the facility that need additional attention.

When an individual robot builds a map, localizes on it, and navigates across it, that map is often stored onboard the robot, or may be stored on a local or cloud-based server that only that robot utilizes. In some cases, a server-based map allows for different robots to access the same map at different times, allowing for only a single robot to access that map file at any one time. In rare circumstances, multiple robots will share a map in realtime, usually requiring all robots to have similar onboard sensors and map-building capabilities, and utilizing a map format that is identical across all robots that use it.

Embodiments described herein include a method for synchronizing a server-based area map that can be utilized by robots of different footprints, from different manufacturers, utilizing different onboard mapping sensors, and storing map data in different formats. This method utilizes a 3D representation of a mapped area, either created by a specific mapping robot or by any other robot in the system, as the baseline map for all other robots. This 3D map is flattened to a 2D map based on the obstacles expected to obstruct the robot based on its height and footprint. That flattened map is then converted into the mapping format required by that specific robot and used onboard that robot to navigate an area. If that onboard map is updated by the robot, it is uploaded back to the server and integrated back into the global 3D map of that area.

EXAMPLES

To understand the unique contributions of robotics systems and software according to these embodiments, various examples of applications of the foregoing principles and embodiments will now be discussed in this context.

As described above, robotics systems according to these embodiments use a single, standardized protocol, meaning that data from any device in the system can be uniformly stored, retrieved, analyzed, compared across other devices, and combined with data from other devices, regardless of the device manufacturers.

Example: Consider a climate-controlled storage warehouse which has deployed environmental monitoring sensors throughout the facility. Cheap temperature sensors can be used to minimize the cost, but strategically placed sensors that jointly measure humidity and temperature and other air quality components should also be included within the facility. With the standardized data protocol, also referred to herein as the "common protocol format", facility-wide heat maps using data from temperature from both brands of sensors can be made. The standardized protocol means that longitudinal data (e.g., looking at the temp in this facility on this same date for each of the last five years to determine how the building may be leaking over time) can be immediately retrieved and processed from a cloud-based system.

According to an embodiment, algorithmic translations of the data can be provided that would, for example, involve triangulation of humidity values from different sensors across a facility map, so as to see where additional air flow would be required. This is another benefit of the map-based approach according to embodiments described herein, robotic systems can determine where peaks and troughs are for humidity levels (or temperature, or signal strength, or CO2, or any other sensor-tracked information), provide a "heat map" of this data plotted against the facility map, and then provide actionable information to the facility manager so that she or he is able to make changes in her facility to address these problems (or to instruct other outside systems, like HVAC, to adapt their behaviors.

The outputs and outcomes of robotics systems according to these embodiments are unique, and are made possible by the standardized inputs, allowing for methods to gather information across devices. That is, the embodiments do not merely combine devices into a single software interface, but allow devices to be collaborative units working in the same ecosystem. Below are provided a progression of examples which demonstrate how the information and analytics of this integrated system can affect decision making according to certain embodiments.

By making all data streams in the same recognizable language and structured protocol, data from disparate devices can be understood/reviewed/processed with the same algorithms, in realtime, on a cloud based system. That is, data from one device can now be both a direct measure and/or a proxy measure for a recommended action. That action can either be completed autonomously by sending commands to connected devices or can be sent as actionable information to the humans in the loop to take action.

Example: Data from a connected device used as a direct measure to affect human staff operations. If door counters show that an office was not entered on a given day, cleaning staff can omit that office from their cleaning schedule.

Example: Data from smart devices extrapolated to provide proxy measurements on non-smart devices. Data analysis can then be used for a connected device to be a proxy measure for a non-connected device, such as if a connected bathroom soap dispenser demonstrates 100 uses, this typically corresponds with 250 tri-fold paper towels that have been used and one garbage can that is expected to be full. The garbage can and paper towel dispenser in this example are not connected devices, but are correlated to the soap dispenser's data.

Example: One connected device serves as an activator for another device. Beacon technology can monitor traffic patterns of personnel movement through hallways of a connected facility. High traffic days can indicate when a deeper clean is required for that hallway. In the case of using a vacuuming robot, it would be commanded to make an additional pass of those high traffic hallways, or could be commanded that no vacuuming is required if no traffic was detected in that hallway. Coupling traffic patterns with a connected outdoor weather station that measures local rainfall can have the intelligence to schedule a mopping robot instead of a vacuuming robot due to the likelihood of mud being present that would not be effectively removed by a vacuuming robot.

As described above, various embodiments provide a map-based view of the facility, a natural and intuitive visual for facility managers, as their work requires them to get goods or provide services to specific locations in a facility. Map-based software allows for asset tracking, which may include mobile tools or machinery, consumables, personnel, and/or static or dynamic devices.

Example: Movement of goods and services (e.g., soap refills, or a planned wipe down of table tops) is done at scheduled intervals, but also may also need to be done on-the-fly (e.g., someone got ill in a hallway and it needs to be tended to now, or no toilet paper in Bathroom 2). On-the-fly requests are both expected, and yet disrupt scheduled maintenance. Map-based facility views of resources (staff and materials) allows for managers to quickly plan logistics, so as to minimize disruptions to previously scheduled maintenance.

Example: A map-based facility view is also necessary when autonomous, dynamic systems—like floor cleaning robots—are added to a facility maintenance plan. That is, smart static devices (e.g., bathroom paper towel dispensers) can send alerts when they are near empty, and the appropriate action can be quickly taken (e.g., go to Bathroom 2 and fill the dispenser), but autonomous dynamic systems need to be tracked spatially so that errors can be addressed (e.g., a door that was supposed to be open is closed, so robot has identified the problem and is waiting for the door to be opened), or so that the device can be located quickly when it needs to be reallocated (e.g., the schedule shows the robot has already started to scrub the cafeteria, but since it was a raining today, we will postpone the cafeteria and need to scrub the front hall instead).

A server-based map of an area wherein a single or plurality of robots are deployed, can be translated from the server-based format to an individual robot's native format, based on the map file's format requirements and the dimensions of the robots, and transmitted onboard to each individual robot in that deployment for localization and navigation. The server-based map can be updated by any robot in the deployment, by an individual robot's natively formatted map being translated into the format of the server-based map within the footprint specifications of the robot's onboard sensors that built the map and transmitted to the server for integration.

In the above examples of interconnected sensors from a variety of manufacturers, these systems can be deployed in various facilities like a high school: multiple standard classrooms, specialty classrooms (like woodshop and home economics kitchens), substantial hallways, large spaces like a gym and cafeteria, and several multi-stall bathrooms, loading bays by the cafeteria, an HVAC system broken into zones, industrial lighting control system, and plumbing monitoring for boilers and supply water.

A deployment in such a facility could include, for example, the following smart devices:
- 30+ air quality sensors (Temperature and humidity sensors distributed throughout the facility; the VOC and CO monitor near a loading dock; CO2 monitors distributed across classrooms and high-volume rooms (cafeteria, auditorium); particulate matter counter near doorways and windows, as well as within shop/home economics class rooms, maintenance rooms, etc.; some environmental monitoring sensors attached to mobile robots for gathering distributed air quality data across non-static locations.)
- 10 Leak detection sensors, standing water sensors
- Individual flow meter sensors on each toilet and sink
- Water shutoff valves for each bathroom, kitchen, and janitors' closet
- Industrial controllers for boilers, HVAC, and plumbing monitoring
- 2 large floor scrubbing/vacuuming robots
- 10 small vacuuming robots
- 5 small floor scrubbing robots
- 1 delivery robot for relocating supplies within the building
- 50 smart soap dispensers (across 10 bathrooms)
- 50 smart paper towel dispensers (across 10 bathrooms)
- 25 door counters (bathroom doors, entry/exit doors to school, etc.)
- 25 traffic/asset monitoring beacons
- Beacon-tracked badges for all employees within the facility
- 1 weather station located outside of the facility In the above example of mobile robots and static devices deployed within a high school, all of the device data is collected in the common central controller protocol described above (and found in Appendix A) and calibrated and normalized to each class of data that is being collected. This generates the single data management framework which allows for all of the data collected from myriad different connected devices to be used in analytics to evaluate whether there are any desirable changes to the usage or behavior of one or more of the connected devices themselves, or to create actionable information for the user of such data to adapt other facility functions, including those outside of the robotic system itself.

In the above example deployment, flow meters at each toilet measure the amount of water used during a flush. The toilets are expected to use 1.5 gallons per flush. If some threshold (e.g., 5 gallons) are detected within a single flush, then the expectation is that there is a stuck flush valve or bathroom leak. The leak detection sensors may not detect a leak, so the central controller algorithms give highest priority to water waste from the toilet, but may lead to a flood in the bathroom, and therefore the following actions are taken: bathroom's water shutoff valve is triggered, floor mopping robot is hailed in case the leak becomes a flood, text message sent to plumber on duty, email sent to facility manager notifying them of the problem.

In the above example deployment, tracking beacons detect a higher than expected number of people in the building late in the evening due to a scheduled meeting. Although the remaining toilet paper and soap in the nearest bathroom to this meeting could have waited until the next morning to be replaced under normal usage conditions, the increased usage rate is predicted by the number of people in the building and a preventative message is sent to the custodian on-duty with an estimate of when the consumables will run out, so they can be replaced before they are empty. The delivery robot is already pre-loaded with consumables resupply originally scheduled for the morning, and is automatically sent to the bathroom ahead of the on-duty custodian.

Not all of the steps of the techniques described herein are necessarily performed in a single deployment or even in a single module.

It should be understood that this description is not intended to limit the invention. On the contrary, the embodiments are intended to cover alternatives, modifications and equivalents, which are included in the spirit and scope of the invention. Further, in the detailed description of the embodiments, numerous specific details are set forth in order to provide a comprehensive understanding of the invention. However, one skilled in the art would understand that various embodiments may be practiced without such specific details.

Although the features and elements of the present embodiments are described in the embodiments in particular combinations, each feature or element can be used alone without the other features and elements of the embodiments or in various combinations with or without other features and elements disclosed herein.

What is claimed is:

1. A central controller for robotics and connected devices comprising:
   a first communication interface configured to receive data from a plurality of robots or connected devices, wherein at least two of the plurality of robots or connected devices are of different types;
   wherein data generated by the plurality of robots or connected devices of different types are generated in different native data formats;
   a processor configured to translate the received data from the different native data formats into a common protocol format;
   a storage framework configured to store the data translated into the common protocol format;
   a second communication interface configured to transmit commands based on the stored data in the common protocol format and translated to the native data format of at least one or more of the plurality of robots or connected devices; and an output display configured to display an image of an operating area in which the plurality of robots or connected devices are deployed and wherein a physical location of each of the plurality of robots or connected devices is represented on the image at the location from which the data is collected;

wherein the central controller is further configured to include on the image a plurality of position-referenced values generated from the processed data, as well as interpolated values between received data points.

2. The central controller of claim 1, wherein:

the data received from each of the plurality of robots or connected device contains a spatial reference to a location point from where the data was collected;

wherein the central controller is further configured to calibrate the data received from each of the plurality of robots or connected devices for differences in at least one or more of: sensor structures, age of hardware from which the data was received, and changes in calibration of the hardware from which the data was received.

3. The central controller of claim 1, wherein:

the image on which the locations of the plurality of robots or connected devices are displayed, is at least one image representing the operating area where the locations of the plurality of robots or connected devices are located, including a map built by a robot or other mapping devices, a structural floorplan for the operating area, a utility or architectural rendering of the operating area, or a graphical representation of the operating area showing location-based data distributed across the image; and the images used for the display are processed to align with every other image that represents the same operating area, including an origin reference point, an orientation, a rotation reference frame, and an image resolution related to actual distance.

4. The central controller of claim 1, wherein:

the central controller is further configured to perform analytics, computations, and interpolations on the received data after the received data has been translated from native data formats into the common protocol format.

5. The central controller of claim 1, wherein:

the commands that are based on the stored data in the common protocol format and translated to the native data format and are transmitted to at least one of the plurality of robots or connected devices, or software interfaces, include commands which are initiated or triggered based on:

a) data received from at least one single robot or connected device within a system; or b) data from at least a plurality of robots or connected devices within a system; or c) data from at least one additional processing of the data from at least one or more of the plurality of robots or connected devices.

6. The central controller of claim 1, further comprising:

a server-based map of an area wherein a single or plurality of robots are deployed, wherein the processor is adapted to translate from the server-based format to an individual robot's native format, based on the map file's format requirements and the dimensions of the robots, and transmitted onboard to each individual robot in that deployment for localization and navigation;

wherein the processor is adapted to update the server-based map by at least one of the robot in the deployment, by an individual robot's natively formatted map being translated into the format of the server-based map within a footprint specifications of a robot's onboard sensors that built the map, and transmitted to the server for integration.

7. A method for controlling robots or connected devices of different types, the method comprising:

receiving data from a plurality of robots or connected devices, wherein at least two of the plurality of robots or connected devices are of different types;

wherein data generated by the plurality of robots or connected devices of different types are generated in different native data formats;

translating the received data from the different native data formats into a common protocol format;

storing the data translated into the common protocol format;

transmitting commands based on the stored data in the common protocol format and translated to the native data format of at least one or more of the plurality of robots or connected devices;

displaying an image of an operating area in which the plurality of robots or connected devices are deployed and wherein a physical location of each of the plurality of robots or connected devices is represented on the image at the location from which the data is collected; and including on the image a plurality of position-referenced values generated from the processed data, as well as interpolated values between received data points.

8. The method of claim 7, wherein the data received from each of the plurality of robots or connected devices contains a spatial reference to a location point from where the data was collected, the method further comprising:

calibrating the data received from each of the plurality of robots or connected devices for differences in at least one or more of: sensor structures, age of hardware from which the data was received, and changes in calibration of the hardware from which the data was received.

9. The method of claim 7, wherein:

the image on which the locations of the plurality of robots or connected devices are displayed, is at least one image representing the operating area where the locations of the plurality of robots or connected devices are located, including a map built by a robot or other mapping devices, a structural floorplan for the operating area, a utility or architectural rendering of the operating area, or a graphical representation of the operating area showing location-based data distributed across the image; and the images are processed to align with every other image that represents the same operating area, including an origin reference point, an orientation, a rotation reference frame, and an image resolution related to actual distance.

10. The method of claim 7, further comprising:

performing analytics, computations, and interpolations on the received data after the received data has been translated from native data formats into the common protocol format.

11. The method of claim 7, wherein:
the commands that are based on the stored data in the common protocol format and translated to the native data format and are transmitted to at least one of the plurality of robots or connected devices, or software interfaces, include commands which are initiated or triggered based on:
a) data received from at least one robot or connected device within a system; or
b) data from at least a plurality of robots or connected devices within a system; or
c) data from at least one of additional processing of the data from at least one or more of the plurality of robots or connected devices.

12. The method of claim 7, further comprising:
generating a server-based map of an area wherein a single or plurality of robots are deployed, wherein the server-based map is translated from the server-based format to an individual robot's native format, based on the map file's format requirements and the dimensions of the robots, and transmitted onboard to each individual robot in that deployment for localization and navigation;
wherein the server-based map is updated by at least one of the robot in the deployment, by an individual robot's natively formatted map being translated into the format of the server-based map within a footprint specifications of a robot's onboard sensors that built the map, and transmitted to the server for integration.

* * * * *